US012289316B2

(12) United States Patent
Freeman et al.

(10) Patent No.: US 12,289,316 B2
(45) Date of Patent: Apr. 29, 2025

(54) MULTI-LEVELED DATA TRANSFER

(71) Applicant: Bank of America Corporation, Charlotte, NC (US)

(72) Inventors: Ion Freeman, Manchester Center, VT (US); Manu Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 236 days.

(21) Appl. No.: 18/200,677

(22) Filed: May 23, 2023

(65) Prior Publication Data

US 2024/0396901 A1    Nov. 28, 2024

(51) Int. Cl.
*H04L 9/40*    (2022.01)

(52) U.S. Cl.
CPC ................. *H04L 63/105* (2013.01)

(58) Field of Classification Search
CPC ........... G06F 21/604; G06F 21/62; G06F 21/6218–6245; H04L 63/0227; H04L 63/0245; H04L 63/0281; H04L 63/105; H04L 63/20
See application file for complete search history.

(56) References Cited

U.S. PATENT DOCUMENTS

| 8,041,946 | B2 * | 10/2011 | Bunn | H04L 63/0281 |
| | | | | 713/153 |
| 2008/0168135 | A1 * | 7/2008 | Redlich | G06F 16/282 |
| | | | | 709/204 |
| 2012/0047364 | A1 * | 2/2012 | Levy | H04L 63/105 |
| | | | | 713/166 |

* cited by examiner

*Primary Examiner* — Kevin Bechtel
(74) *Attorney, Agent, or Firm* — Weiss & Arons LLP

(57) ABSTRACT

Methods, systems and apparatus for controlled data transmission within leveled data environments is provided. Methods may include transmitting a dataset, using a data driver, from a first data environment to a second data environment. Methods may include intercepting the dataset at a reception gateway. Methods may include transmitting an identification. The identification request may request an original data environment from which the data originated; and a destination data environment to which the data is being transmitted. Methods may include in response to receiving a reply to the identification request, authenticating the reply. Methods may include initiating a security level compatibility check. Methods may include determining whether the first data environment is compatible with the second data environment. Methods may include transmitting the dataset through an auto-sanitization engine. Methods may include fragmenting the data into a plurality of data segments. Methods may include assigning to each data segment a security level. Methods may include masking data segments determined to have a security clearance level greater than the security level of the second data environment. Methods may include building a second dataset with remaining data segments. Methods may include storing the second dataset at the second data environment.

20 Claims, 7 Drawing Sheets

MULTI-LEVELED DATA TRANSFER

FIELD OF TECHNOLOGY

The field of technology relates to data transfer.

BACKGROUND OF THE DISCLOSURE

Many entities may have a plurality of data environments. The plurality of data environments may have different levels of controls. The numerous data environments may have different levels of security clearance. When transferring data between environments, it may be hard to know what the controls and security clearance are for each environment. There is no known technological framework for supporting controls for the transfer of data between different environments.

Therefore, it may be desirable to provide a system for managing the transfer of data between different data environments with different levels of controls. It may be desirable to provide a system wherein each data transfer includes an identification step requiring the retrieval of environment specific identification from the environments in which the data is being transferred.

Datasets may be transferred to multiple data environments. It may be hard to know where the data originated and where the data may be going. It may be hard to monitor security clearance of the data without knowledge of the origination and destination of the dataset.

It may therefore be desirable to provide a system that requires an identification check on the original and destination environments when transferring data within a network. It may be further desirable to provide a system to ensure compatibility between the two environments before initiating a data transfer.

At times, one data environment may serve as a proxy for another environment. Data environments may not be correctly identified. Without knowledge of the identification, data transfer between environments may not be trusted.

It may therefore be desirable to provide a system for authentication of data environments when managing the transfer of data between different data environments. This is particularly true when there are different levels of controls associated with the various data environments.

SUMMARY OF THE DISCLOSURE

Systems, apparatus and methods for controlled data transmission between data environments are provided. Methods may include transmitting a dataset. The dataset may be transmitted from a first data environment to a second data environment.

The first and second data environment may be included in a network. The network may be an edge network. The network may be a local area network (LAN). The network may be a wide area network (WAN). The network may be any suitable network.

The first and second data environments may include nodes. The first and second data environments may include computing devices. The first and second data environments may include communication channels. The first and second data environments may be domain specific. The first and second data environments may have certain assigned tasks. The first and second data environments may have certain assigned controls. The first and second data environments may have certain assigned security levels.

Methods may include using a data driver to transmit the dataset. The data driver may transmit the dataset from a first data environment to a second data environment. The data may originate from an original data environment. The dataset may be transmitted to a destination data environment. The dataset may have been transmitted from the original data environment to the first data environment. The dataset may be transmitted from the second data environment to the destination data environment.

The original data environment may be located upstream from the first data environment. The destination data environment may be located downstream from the second data environment. Transfer of data between two data environments may be a part of the transfer of data from the original data environment to the destination data environment.

Methods may include intercepting the dataset at a reception gateway. The reception gateway may be located at the second environment. The reception gateway may include hardware components. The reception gateway may include software components. The reception gateway may include a computing device. The reception gateway may include a hardware processor. The reception gateway may include a hardware memory. The reception gateway may run a protocol. The reception gateway, based on the protocol, may enable entry of data into the second environment.

The reception gateway may intercept the dataset by placing a hold on the dataset. Placing a hold on the dataset may include halting the transmission of the dataset. Placing a hold may include temporarily storing the dataset at the reception gateway.

Methods may include transmitting an identification request. The identification request may be transmitted from the reception gateway to a delivery gateway. The delivery gateway may be located at the first data environment. The delivery gateway may include hardware components. The delivery gateway may include software components. The delivery gateway may include a computing device. The delivery gateway may include a hardware processor. The delivery gateway may include a hardware memory. The delivery gateway may run a protocol. The delivery gateway, based on the protocol, may monitor data exiting from the first environment.

The identification request may request an original data environment from which the data originated. The identification request may request a location to which the data is being transmitted. The identification request may request a destination data environment to which the data is being transmitted. The delivery gateway may transmit a response message to the identification request. The response message may identify an original data environment and a destination data environment. The response message may be transmitted to the reception gateway.

In some embodiments, the delivery gateway may not respond to the identification request. If the reception gateway does not receive a response message from the delivery gateway, the reception gateway may prevent the transmission of the dataset.

Methods may further include transmitting an identification verification request to the delivery gateway. The identification verification request may confirm that the dataset came from the first data environment. The identification verification request may confirm that the dataset is intended to be transmitted to the second data environment. The identification verification request may confirm the identification of the data environments using metadata sets associated with each data environment.

In response to receiving a response message to the identification request, the reception gateway may initiate a security level compatibility check. The security level compatibility may include retrieving a first security level associated with the original data environment. The security level compatibility check may include retrieving a second security level associated with the destination data environment. The first and second security level may be included among, or from a part of, a plurality of security levels. The security levels may be stored in a network repository. The security levels may be retrieved from the network repository.

The security level compatibility check may include determining a first range of security levels compatible with the original data environment. The first range of security levels may include one or more security levels that are greater than the security level of the first data environment. The first range may include one or more security levels that are less than the security level of the first data environment. The range may be determined based on a predetermined maximum difference between the security levels of the first data environment.

The security level compatibility check may include determining a second range of security levels compatible with the second data environment. The second range of security levels may include one or more security levels that are greater than the security level of the second data environment. The second range may include one or more security levels that are less than the security level of the second data environment. The range may be determined based on a predetermined maximum difference from the security level of the second data environment.

The security level compatibility check may include determining whether the first range is compatible with the second range. The determining may be initiated based on a threshold compatibility value. The threshold compatibility value may be determined by a predetermined maximum difference between the first range of security levels and the second range of security levels.

Methods may include in response to a determination that the first range of security levels is not to be compatible with the second range of security levels, preventing the transmission of the dataset to the second data environment.

Methods may include, in response to a determination that the security level compatibility value is above a threshold security level compatibility value, removing the dataset from the hold at the reception gateway. Removing the hold may include resuming the transmission of the dataset to the second data environment.

Methods may include transmitting the dataset through an auto-sanitization engine. The auto-sanitization engine may be located at the second data environment. The auto-sanitization engine may include hardware components. The auto-sanitization engine may include software components. The auto-sanitization engine may include a computing device. The auto-sanitization engine may include a hardware processor. The auto-sanitization engine may run an artificial intelligence (AI) model. The auto-sanitization engine may include a hardware memory. The auto-sanitization engine may filter the dataset. The auto-sanitization engine may filter the dataset before storage at the second data environment.

The auto-sanitization engine may fragment data included in the dataset into a plurality of data segments. The auto-sanitization engine may fragment the dataset using the AI model. The auto-sanitization engine may assign to each data segment a security level. The security level may be included in the plurality of security levels stored at the network repository.

Because a range of security values may be calculated when determining compatibility between data environments, some datasets that may be transferred may include data that is of a higher security level than the data environment to which the data is being transferred. As such, the dataset may be transferred to the desired data environment. However, data that is determined to have a greater security level may be masked before the transferring of the dataset.

The auto-sanitization engine may mask data segments determined to have a security clearance level greater than the security level of the second data environment. Masking data segments may include deactivating the data. Deactivating the data may prevent a user from accessing the data in the second data environment.

The data segments that were not masked or deleted may be tagged as remaining data segments. The auto-sanitization engine may label the remaining data segments as open data segments. The auto-sanitization engine may build a second dataset with the open data segments. The second dataset may have a security level that is equal to or less than the security level of the second data environment. The second dataset may include the masked data. The second dataset may not include the masked data. The masked data may be deleted when the second dataset is built. The masked data may be stored at another location when the second dataset is built. The auto-sanitization engine may store the second dataset at the second data environment.

Methods may further include performing a data push. The data push may send a notice to an application programming interface (API). The API may be configured to register that the dataset originated from the original data environment. The API may be configured to register that the dataset is being transmitted to the destination data environment. The API may be configured to authenticate that the original environment is the environment where the data originated. The API may be configured to authenticate that the destination of the dataset is the destination environment. The API may be configured to authenticate the data environments using metadata associated with each data environment.

BRIEF DESCRIPTION OF THE DRAWINGS

The objects and advantages of the invention will be apparent upon consideration of the following detailed description, taken in conjunction with the accompanying drawings, in which like reference characters refer to like parts throughout and in which.

DETAILED DESCRIPTION OF THE DISCLOSURE

Figure 1:
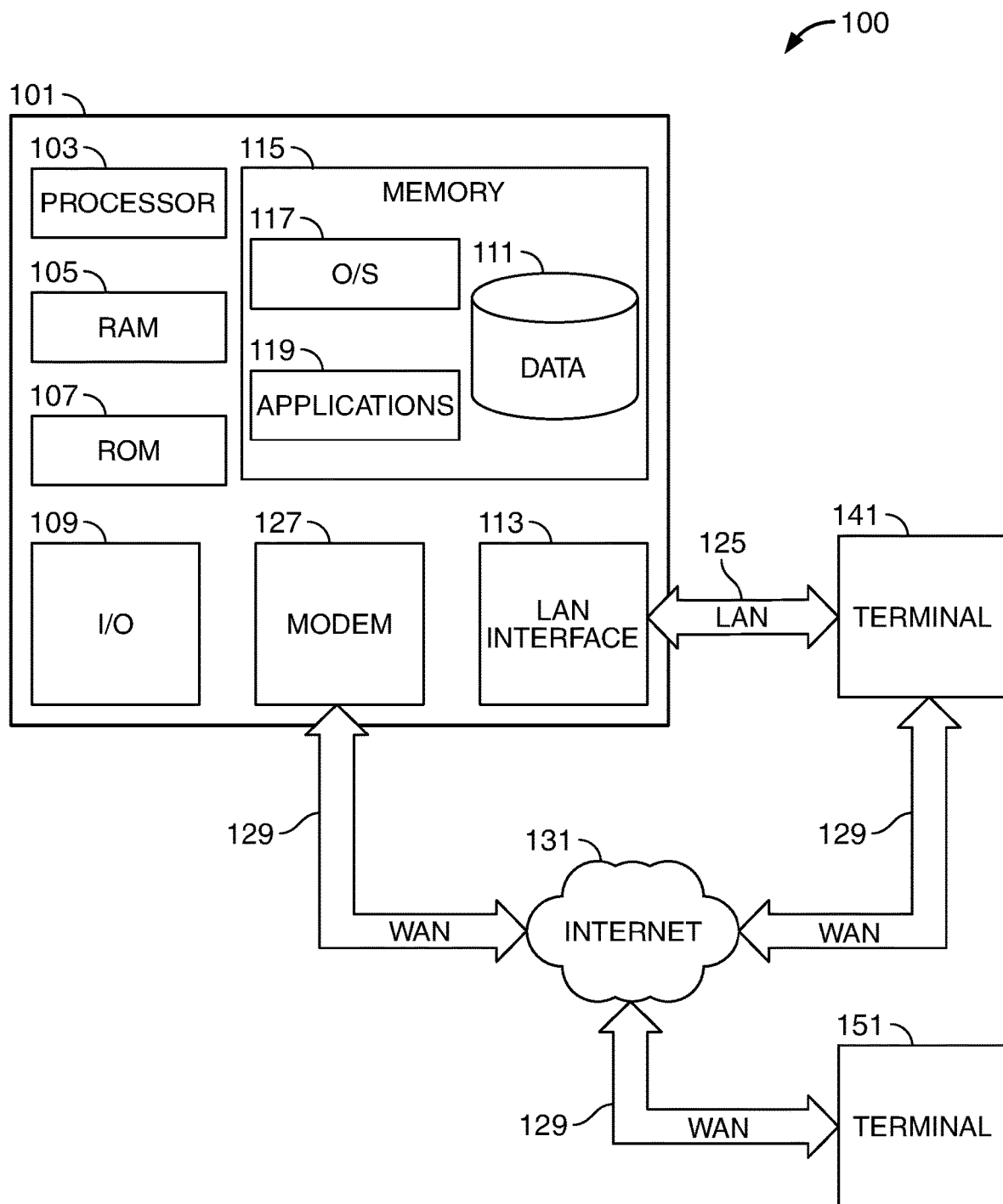
FIG. 1 shows an illustrative diagram in accordance with principles of the invention.

Apparatus, methods and systems for controlled data transmission between leveled data environments are provided.

Apparatus may include a network. The network may be an edge network, a local area network (LAN), a wide area network, a decentralized network or any other suitable network.

The network may include a first data environment. The network may include a second data environment. The network may include a plurality of data environments. The data environments may include nodes. The data environments may include computing devices. The data environments may include communication channels. The data environments may be domain specific. The data environments may have certain assigned tasks. The data environments may have certain assigned controls. The data environments may have certain assigned security levels.

The apparatus may include a data driver. The data driver may transmit a dataset from the first data environment to the second data environment. The data driver may transmit a dataset from any one data environment to any other data environment.

The apparatus may include a delivery gateway. The delivery gateway may monitor data being transmitted from a data environment. The delivery gateway may include hardware components. The delivery gateway may include a computing device. The delivery gateway may include a memory. The delivery gateway may include a processor. The delivery gateway may include software components. The delivery gateway may run protocols using the software and hardware components.

The apparatus may include a reception gateway. The reception gateway may enable entry of data into a data environment. The reception gateway may include hardware components. The reception gateway may include a computing device. The reception gateway may include a memory. The reception gateway may include a processor. The reception gateway may include software components. The reception gateway may run protocols using the software and hardware components.

The reception gateway may intercept the data driver. The reception gateway may initiate a hold on the dataset. The reception gateway may transmit an identification request to the delivery gateway. The identification request may request the delivery gateway to identify a data environment from which the data originated. The identification request may request the delivery gateway to identify a data environment to which the data is being transmitted.

The delivery gateway may not reply to the identification request. If the delivery gateway does not reply to the identification request, the reception gateway may halt the transmission of the dataset.

The delivery gateway may reply to the identification request. The reply may include an identification of the data environment from which the data originated. The reply may include an identification of the data environment to which the data is being transmitted. In response to receiving the reply, the reception gateway may initiate an authentication protocol.

The authentication protocol may retrieve an environment identifier for the two environments involved in the data transfer. The authentication protocol may retrieve the environment identifier from a metadata storage location associated with each data environment. The first data environment may have a first environment identifier. The second data environment may have a second data identifier.

An environment identifier may include metadata tags. Each metadata tag may tag a data environment with an identifying name. An environment identifier may include identification numbers, each identification number may be associated with a specific data environment. An environment identifier may include any other suitable environment identifier.

The authentication protocol may retrieve from the reply to the identification request, the identified data environment from which the data originated. The authentication protocol may retrieve, from the reply to the identification request, the identified data environment to which the data is being transmitted.

The authentication protocol may compare the environment identifiers from the metadata storage location with the environments identified from the reply to the identification request. The authentication protocol may determine if the environment identifiers confirm the reply to the data request identifying the data environment.

In response to determining that the data environment from which the data originated is not the first data environment, or that the data environment to which the data is being transmitted is not the second data environment, the reception gateway may prevent the transmission of the data.

In response to determining that the data environment from which the data originated is the first data environment, and that the data environment to which the data is being transmitted is the second data environment, the reception gateway may initiate a security level compatibility check.

The reception gateway may retrieve a first security level. The first security level may be associated with the first data environment. The reception gateway may retrieve a second security level. The second security level may be associated with the second data environment. Each security level may be included in a plurality of security levels. The plurality of network levels may be stored at a network repository.

The reception gateway may determine a first range of security levels. The first range of security levels may be compatible with the first data environment. The reception gateway may determine a second range of security levels. The second range of security levels may be compatible with the second data environment. The reception gateway may determine a difference between the first and second range. The difference may be assigned a security level compatibility value.

The reception gateway may determine whether the first range is compatible with the second range based on a threshold compatibility value. The threshold compatibility value may be determined by a predetermined maximum difference between the first range of security levels and the second range of security levels.

In response to a determination that the security level compatibility value is less than a threshold security level compatibility value dataset, the reception gateway may halt the transmission of the dataset. In response to a determination that the security level compatibility value is above a threshold security level compatibility value, the reception gateway may remove the dataset from the hold at the reception gateway.

The reception gateway may transmit the dataset through an auto-sanitization engine. The auto-sanitization engine may include hardware components. The auto-sanitization engine may include a memory. The auto-sanitization engine may include a processor. The auto-sanitization engine may include software components. The auto-sanitization engine may run an artificial intelligence (AI) model.

The auto-sanitization engine may fragment data included in the dataset into a plurality of data segments. The auto-sanitization engine may assign to each data segment a security level included in the plurality of security levels. The auto-sanitization engine may mask data segments determined to have a security clearance level greater than the security level of the second data environment. The auto-sanitization engine may delete data segments determined to have a security clearance level greater than the security level of the second data environment. The auto-sanitization engine may transmit data segments determined to have a security clearance level greater than the security level of the second data environment back to the first data environment. The auto-sanitization engine may label remaining data segments as open data segments. The auto-sanitization engine may build a second dataset with the open data segments. The second dataset may be stored at the second data environment.

The apparatus may include an application programming interface (API). The reception gateway may perform a data push to the API. The API may register that the dataset originated from the first data environment. The API may register that the dataset is being transmitted to the second data environment.

Illustrative method steps may be combined. For example, an illustrative method may include steps shown in connection with another illustrative method.

The steps of methods may be performed in an order other than the order shown or described herein. Embodiments may omit steps shown or described in connection with illustrative methods. Embodiments may include steps that are neither shown nor described in connection with illustrative methods.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of system 100 that includes computer 101. Computer 101 may alternatively be referred to herein as an "engine," "server" or a "computing device." Computer 101 may be a workstation, desktop, laptop, tablet, smart phone, or any other suitable computing device. Elements of system 100, including computer 101, may be used to implement various aspects of the systems and methods disclosed herein. Each of the data environments, data drivers, data environment gateways, the auto-sanitization engine and any other part of the disclosure may include some or all of apparatus included in system 100.

Computer 101 may have a processor 103 for controlling the operation of the device and its associated components and may include RAM 105, ROM 107, input/output circuit 109 and a non-transitory or non-volatile memory 115. Machine-readable memory may be configured to store information in machine-readable data structures. The processor 103 may also execute all software running on the computer—e.g., the operating system and/or voice recognition software. Other components commonly used for computers, such as EEPROM or Flash memory or any other suitable components, may also be part of the computer 101.

Memory 115 may be comprised of any suitable permanent storage technology—e.g., a hard drive. The memory 115 may store software including the operating system 117 and application(s) 119 along with any data 111 needed for the operation of the system 100. Memory 115 may also store videos, text and/or audio assistance files. The data environments included in the network, the application programming interface (API), the auto-sanitization engine as described herein may have one or more features in common with Memory 115. The data stored in Memory 115 may also be stored in cache memory, or any other suitable memory.

Input/output ("I/O") module 109 may include connectivity to a microphone, keyboard, touch screen, mouse and/or stylus through which input may be provided into computer 101. The input may include input relating to cursor movement. The input/output module may also include one or more speakers for providing audio output and a video display device for providing textual, audio, audiovisual and/or graphical output. The input and output may be related to computer application functionality.

System 100 may be connected to other systems via a local area network (LAN) interface 113. System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 3 include a local area network (LAN) 125 and a wide area network (WAN) 129 but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131. Connections between System 100 and Terminals 151 and/or 141 may be used for the data environment gateways to communicate with other data environment gateways. Terminals 151 and/or 141 may be used to communicate between components of a network as described herein.

It will be appreciated if the network connections shown are illustrative and other means of establishing a communications link between computers may be used. The existence of various well-known protocols such as TCP/IP, Ethernet, FTP, HTTP and the like is presumed and the system can be operated in a client-server configuration to permit retrieval of data from a web-based server or API. Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS) and voice input and speech recognition applications. Application program(s) 119 (which may be alternatively referred to herein as "plugins," "applications," or "apps") may include computer executable instructions for invoking functionality related to performing various tasks. Application programs 119 may utilize one or more algorithms that process received executable instructions, perform power management routines or other suitable tasks. Application programs 119 may utilize one or more decisioning processes for the processing of calls received from calling sources as detailed herein.

Application program(s) 119 may include computer executable instructions (alternatively referred to as "programs"). The computer executable instructions may be embodied in hardware or firmware (not shown). Computer 101 may execute the instructions embodied by the application program(s) 119 to perform various functions.

Application program(s) 119 may utilize the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage and process data (e.g., "cloud computing" and/or "fog computing").

Any information described above in connection with database 111 and any other suitable information, may be stored in memory 115. One or more of applications 119 may include one or more algorithms that may be used to implement features of the disclosure comprising the push messaging, processing, routing and/or any other tasks described herein.

The invention may be described in the context of computer-executable instructions, such as applications 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered for the purposes of this application, as engines with respect to the performance of the particular tasks to which the programs are assigned.

Computer 101 and/or terminals 141 and 151 may also include various other components, such as a battery, speaker and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 151 and/or terminal 141 may be portable devices such as a laptop, cell phone, tablet, smartphone, or any other computing system for receiving, storing, transmitting and/or displaying relevant information. Terminal 151 and/or terminal 141 may be one or more data sources or a calling source. Terminals 151 and 141 may have one or more features in common with apparatus 101. Terminals 115 and 141 may be identical to system 100 or different. The differences may be related to hardware components and/or software components.

The invention may be operational with numerous other general purpose or special purpose computing system environments or configurations. Examples of well-known computing systems, environments and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices and the like.

Figure 2:
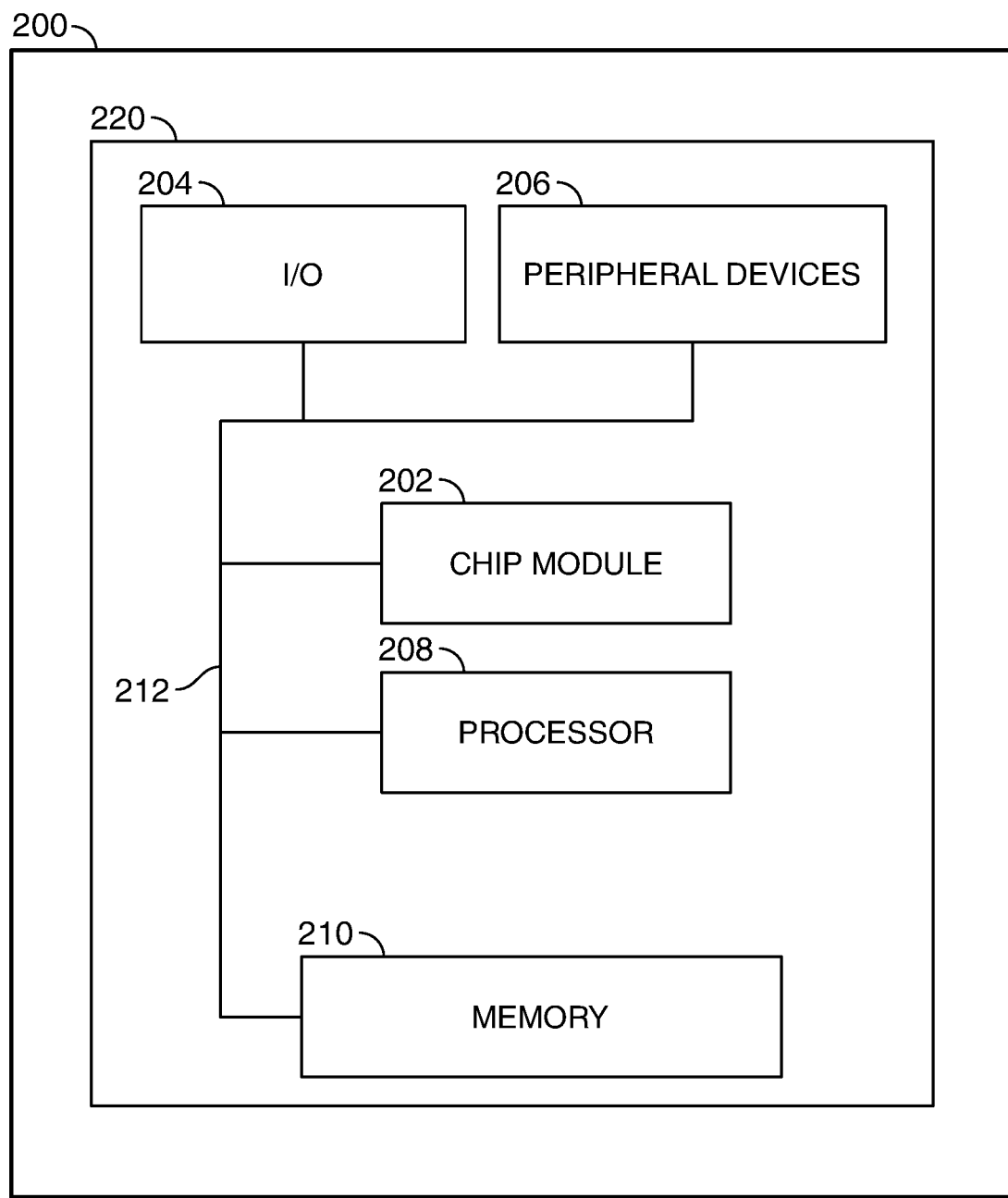
FIG. 2 shows another illustrative diagram in accordance with principles of the invention.

FIG. 2 shows illustrative apparatus 200 that may be configured in accordance with the principles of the disclosure. Apparatus 200 may be a computing device. Apparatus 200 may include one or more features of the apparatus shown in FIG. 1. Apparatus 200 may include chip module 202, which may include one or more integrated circuits and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 119, signals and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
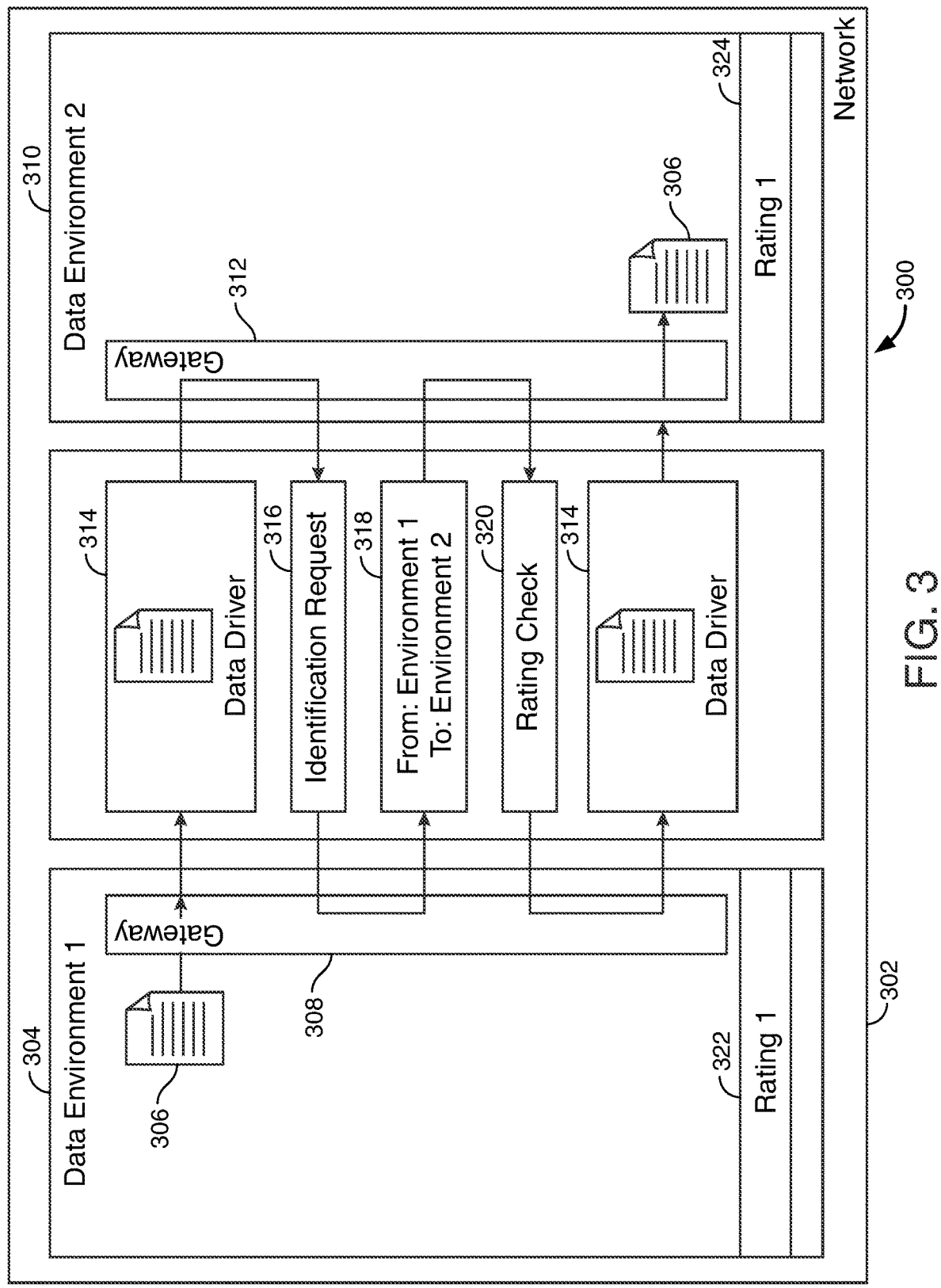
FIG. 3 shows yet another illustrative diagram in accordance with principles of the invention.

FIG. 3 shows illustrative system 300. System 300 may include network 302. Network 302 may be a local area network (LAN), a wide area network (WAN), a distributed network, an edge network or any other suitable network. Network 302 may include data environment 304 and data environment 310. Data environment 304 may include computing devices, connection points and communications channels. Data environment 310 may include computing devices, connection points and communications channels. Data environments 304 and 310 may be separated by domain. Domain for the purpose of this application may be understood to mean an aggregation of entities organized around a common functional entity purpose. Each domain may include customized controls, preset conditions and any other suitable domain differentiation. The domains for each data environment may be unique. The domains for each environment be industry specific. The domains for each environment may be task specific.

Data environment 304 may include gateway 308. Gateway 308 may be initiated on a computing device. Gateway 308 may include hardware components. Gateway 308 may include software components. Gateway 308 may monitor data exiting data environment 304. Data environment 310 may include gateway 312. Gateway 312 may be initiated on a computing device. Gateway 312 may include hardware components. Gateway 312 may include software components. Gateway 312 may enable entry of data into data environment 310.

Dataset 306 may be stored at data environment 304. Data environment 304 may transmit dataset 306 to data environment 310. Data driver 314 may transmit dataset 306 to data environment 310. Data driver 314 may be intercepted at gateway 312. The intercepting may include holding dataset 306 at gateway 312. While gateway 312 is holding dataset 306, gateway 312 may transmit identification request 316 to data environment 304. The identification request may require data environment 304 to state what environment dataset 306 is coming from and the intended destination of dataset 306.

Gateway 308 may intercept identification request 316. Gateway 308 may respond to identification request 316 in response message 318. Gateway 308 may identify that dataset 306 may be coming from data environment 304. Gateway 308 may identify that the intended destination for dataset 306 is data environment 310.

Gateway 312 may receive response message 318 from gateway 308. Gateway 312 may authenticate response message 318. Once gateway 312 authenticates response message 318, gateway 312 may initiate rating check 320. Rating check 320 may retrieve a security level for data environment 304 and data environment 310. Gateway 312 may retrieve the security levels from a network repository. Data environment 304 may be assigned security level range 322. Security level range 322 may be a level 1 security range. Data environment 310 may be assigned security level range 324. Security level range 324 may be within a level 1 security range.

Rating check 320 may calculate a compatibility value between first environment 304 and the second data environment 312. The compatibility value may be determined by calculating a difference between security level range 324 and security level range 322. If the difference is above a predetermined threshold difference, the transmission may resume. If the difference is below the predetermined threshold difference, the transmission may be halted.

Security level range 322 may be determined to be equal to security level 324. In response to determining that security level range 322 is equal to security level range 324, gateway 312 may release dataset 306 from the hold. Dataset 306 may be transmitting to data environment 310. Dataset 306 may be stored at data environment 310.

Figure 4:
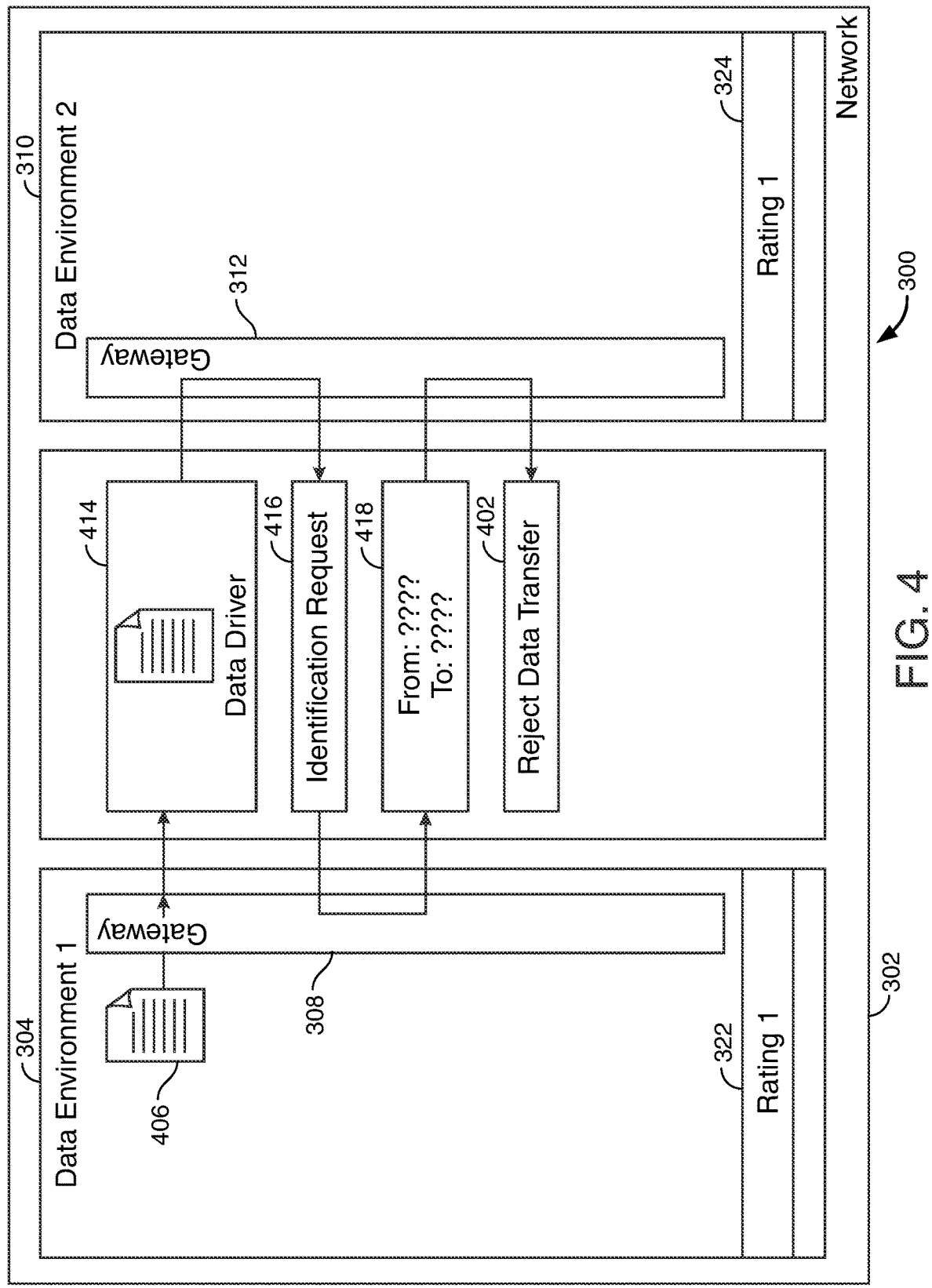
FIG. 4 shows still another illustrative diagram in accordance with principles of the invention.

FIG. 4 shows system 300. Dataset 406 may be transmitted from data environment 304 to data environment 310. Dataset 406 may be transmitted by data driver 414. Gateway 312 may intercept data driver 414 before dataset 406 is transmitted to data environment 310. Gateway 312 may transmit identification request 416 to data environment 304. Gateway 308 may intercept identification request 416. Gateway 308 may transmit response message 418 to gateway 312. Response message 418 may not include the data environment from which dataset 406 is coming from. Response message 418 may not include the data environment to which the data is being sent. Response message 418 may be empty.

Upon receiving response message 418, gateway 312 may initiate rejection 402. Rejection 402 may halt the transmission of dataset 406. Halting the transmission of dataset 406 may include returning dataset 406 to data environment 304. Halting the transmission of dataset 406 may include deleting dataset 406. Halting the transmission of dataset 406 may include indefinitely holding dataset 406 at gateway 312.

Figure 5:
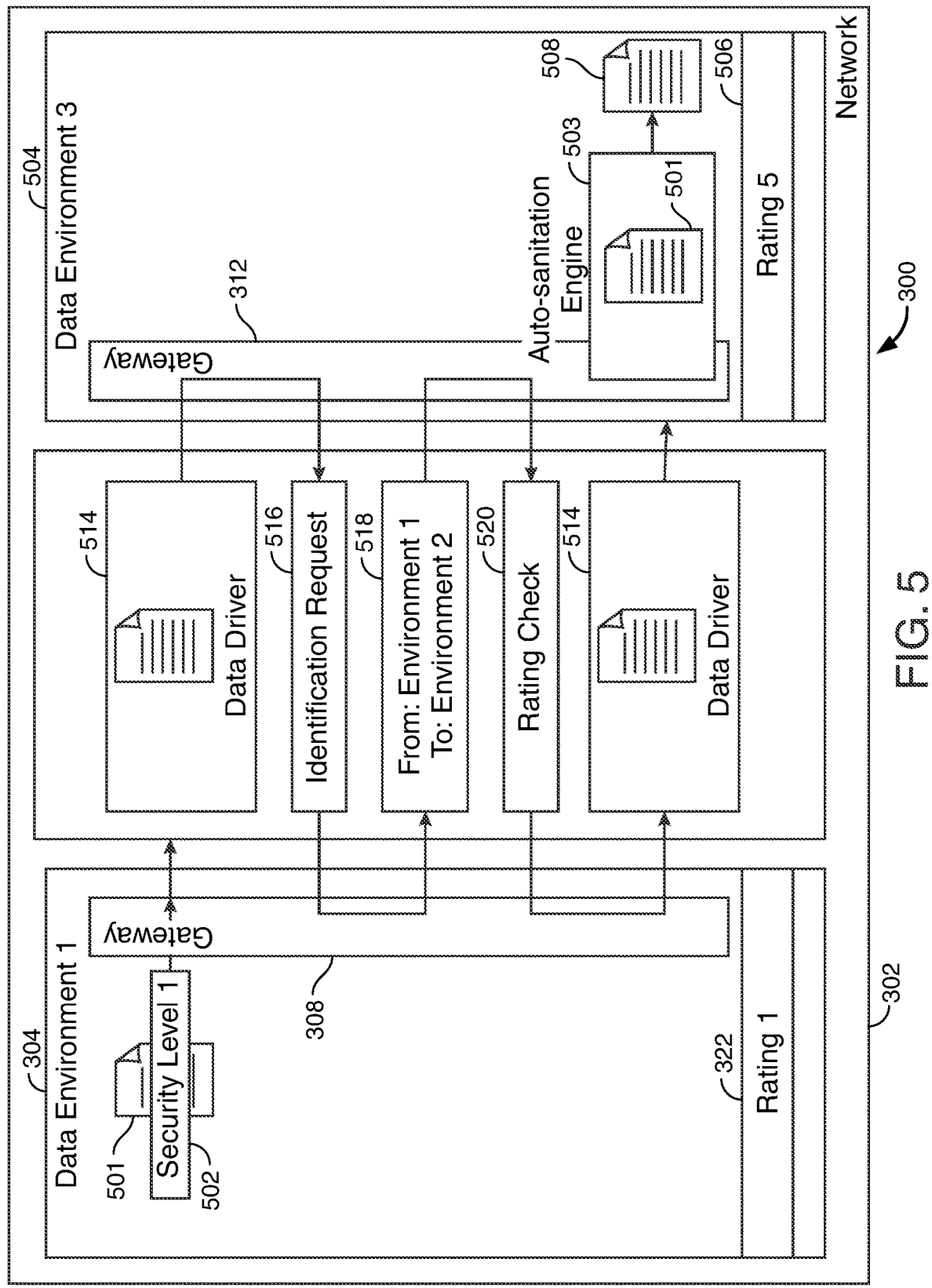
FIG. 5 shows yet another illustrative diagram in accordance with principles of the invention.

FIG. 5 shows system 300. Dataset 501 may be transmitted from data environment 304 to data environment 504. Dataset 501 may be transmitted through data driver 514. Gateway 312 may intercept data driver 514. Gateway 312 may place dataset 501 in a hold. Gateway 312 may transmit identification request 516 to data environment 304. Gateway 308 may transmit response message 518 in response to receiving identification request 516. Response message 518 may state the environment from which dataset 501 originates and the environment to where dataset 501 is being transmitted. Dataset 501 may originate from data environment 304. Dataset 501 may be transmitted to data environment 504.

In response to receiving response message 518, gateway 312 may initiate rating check 520. Rating check 520 may initiate a retrieval of a security level for data environment 304 and data environment 504. Data environment 304 may be assigned security level range 322. Security level range 322 may be a level 1 security range. Data environment 504 may be assigned security level range 506. Security level range 506 may be assigned a level 5 security range.

Rating check 320 may calculate a compatibility value between first environment 304 and the second environment 504. The compatibility value may be determined by calculating a difference between security level range 322 and security level range 506. In response to determining that the difference between security level range 322 and security level range 506 is above the predetermined threshold difference, dataset 501 may be released from the hold at gateway 312.

The determined difference between security level range 322 and security level range 506 may be determined to be above the predetermined threshold difference. Because of the difference between security level range 322 and security level range 506, the dataset may be transmitted to data environment 504 through auto-sanitization engine 503. Dataset 501 may be assigned security level 502. Dataset 501 may be masked and filtered in auto-sanitization engine 503. Based on the masking and filtering dataset 501 may be converted into dataset 508.

Figure 6:
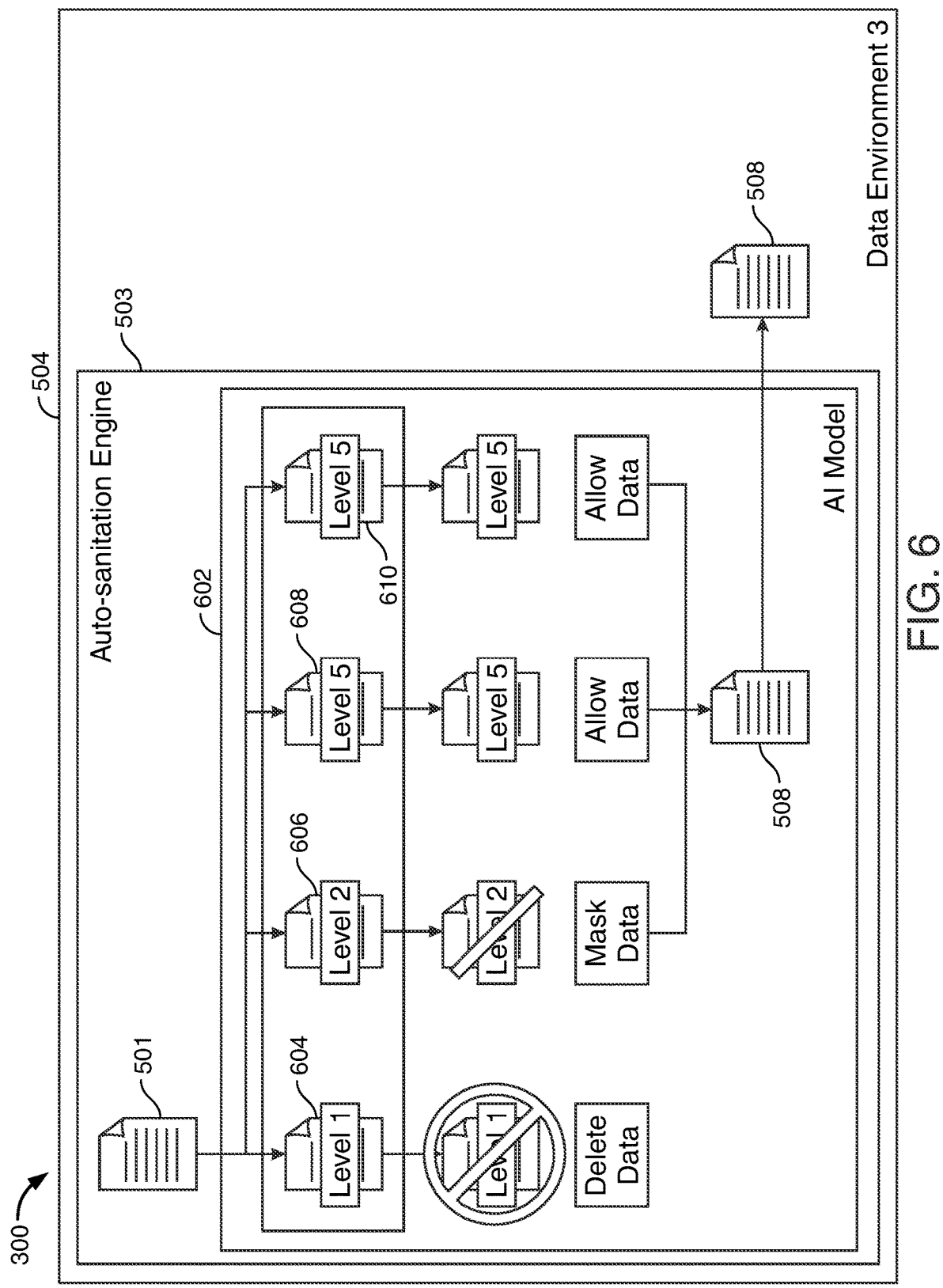
FIG. 6 shows still another illustrative diagram in accordance with principles of the invention.

FIG. 6 shows auto-sanitization engine 503 as shown in system 300. Auto-sanitization engine 503 may include artificial intelligence (AI) model 602. Dataset 501 may be fragmented into data segments 604, 606, 608 and 610. Data may be fragmented using AI model 602. Data segments 604, 606, 608 and 610 may be assigned security levels. The security levels may be included in a plurality of predefined security levels stored at a repository associated with network 302. Data segment 604 may be assigned a level one security level. Data segment 606 may be assigned a level 2 security level. Data segment 608 may be assigned a level 5 security level. Data segment 610 may be assigned a level 5 security level.

Because data segment 604 is assigned a higher security level than data environment 504, data segment 604 may be deleted from dataset 501. Because data segment 606 is assigned a higher security level than data environment 504, data segment may be masked. Data segments 606, 608, and 610 may be combined to create dataset 508. Dataset 508 may be transmitted to data environment 504. Dataset 508 may be stored at data environment 504.

Figure 7:
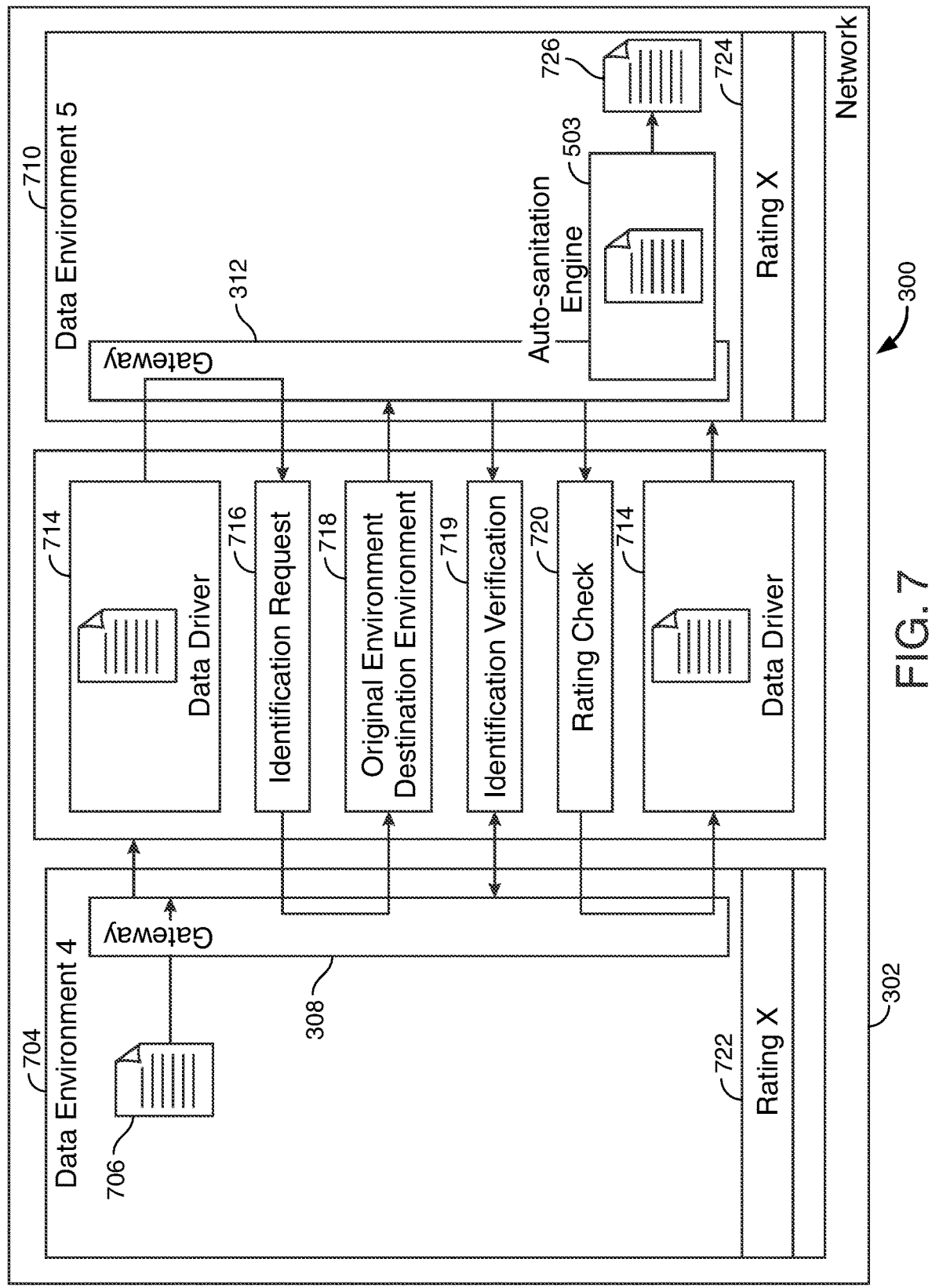
FIG. 7 shows still another illustrative diagram in accordance with principles of the invention.

FIG. 7 shows system 300. When transferring dataset 706 from data environment 704 to data environment 710 via data driver 714, gateway 312 may transmit identification request 716 to gateway 308. Identification request 716 may request gateway 308 to identify from which environment dataset 706 originated. Identification request 716 may request gateway 308 to identify the intended destination environment to which dataset 706 is being transmitted. Dataset 706 may have originated in data environment 1. Dataset 706 may have originated from any suitable environment. Data environments 704 and 710 may be part of a transmission path for dataset 706. Data environments 704 and 710 may be neither the original data environment, nor the destination data environment.

In response to receiving response message 718 to identification request 716, gateway 312 may initiate identification verification 719. Response message 718 may identify a data environment from which dataset 706 originated. Response message 718 may identify a data environment to which dataset 706 is being transmitted. Identification verification 719 may include verifying that the identified original data environment is the environment at which dataset 706 originated from and the identified destination environment is the environment to which dataset 706 is being transmitted. Identification verification 719 may use metadata sets associated with each data environment to authenticate response message 718.

Identification verification 719 may not be able to authenticate response message 718. If identification verification 719 cannot identify response message 718, gateway 312 may halt the transmission of dataset 706. Identification verification 719 may authenticate response message 718. In response to authenticating response message 718, gateway 312 may initiate rating check 720. Rating check 720 may include comparing the range of security levels assigned to the original data environment and destination data environment. Rating check 720 may compare security level range 722 assigned to data environment 704 and security level range 724 assigned to data environment 710. In response to determining that the security level ranges are compatible, gateway 312 may resume the transmission of dataset 706. Dataset 706 may be transmitted through auto-sanitization engine 503. Dataset 706 may be fragmented, masked, and/or deleted in auto-sanitization engine 503. Dataset 706 may be recreated as dataset 726. Dataset 726 may be saved to data environment 710.

Thus, methods and apparatus for a MULTI-LEVELED DATA TRANSFER are provided. Persons skilled in the art will appreciate that the present disclosure can be practiced by other than the described embodiments, which are presented for purposes of illustration rather than of limitation and that the present disclosure is limited only by the claims that follow.

What is claimed is:

1. A method for controlled data transmission within leveled data environments, the method comprising:
   transmitting a dataset, using a data driver, from a first data environment to a second data environment within a network;
   intercepting the dataset at a reception gateway, the intercepting placing a hold on the dataset, the reception gateway enabling entry of data into the second data environment;
   transmitting an identification request to a delivery gateway, the delivery gateway monitoring data exiting from the first data environment, the identification request requesting:
      an original data environment from which the data originated; and
      a destination data environment to which the data is being transmitted;
   initiating a security level compatibility check comprising:
      retrieving a first security level associated with the original data environment and a second security level associated with the destination data environment, the first and second security level being included in a plurality of security levels stored in a network repository;
      determining a first range of security levels compatible with the original data environment;
      determining a second range of security levels compatible with the destination data environment; and
      determining whether the first range is compatible with the second range based on a threshold compatibility value;
   in response to a determination that a determined security level compatibility value is above the threshold compatibility value, removing the dataset from the hold at the reception gateway;
   transmitting the dataset through an auto-sanitization engine, the auto-sanitization engine at the second data environment, the auto-sanitization engine:
      fragmenting the data included in the dataset into a plurality of data segments;
      assigning to each data segment a security level included in the plurality of security levels;
      masking data segments determined to have a security clearance level greater than the security level of the second data environment;
      labeling remaining data segments as open data segments; and
      building a second dataset with the open data segments; and
   storing the second dataset at the second data environment.

2. The method of claim 1 wherein the threshold compatibility value is determined by a predetermined maximum difference between the first range of security levels and the second range of security levels.

3. The method of claim 1 further comprising, when creating the second dataset with the open data segments deleting the masked data segments.

4. The method of claim 1 wherein, when the first range of security levels is determined not to be compatible with the second range of security levels, preventing transmission of the dataset to the second data environment.

5. The method of claim 1 wherein the auto-sanitization engine includes an artificial intelligence model.

6. The method of claim 1 wherein when the delivery gateway does not respond to the identification request, the reception gateway is configured to halt transmission of the dataset.

7. The method of claim 1 wherein the original data environment is upstream from the first data environment.

8. The method of claim 1 wherein the destination data environment is downstream from the second data environment.

9. The method of claim 1 further comprising performing a data push to an application programming interface (API), the API configured to:
   register:
      that the dataset originated from the original data environment; and
      that the dataset is being transmitted to the destination data environment; and
   authenticate that:
      the original data environment is the environment where the data originated; and
      a destination of the dataset is the destination data environment.

10. A method for controlled data transmission within leveled data environments, the method comprising:
   transmitting a dataset, using a data driver, from a first data environment to a second data environment within a network;
   intercepting the dataset at a reception gateway, the intercepting placing a hold on the dataset, the reception gateway enabling entry of data into the second data environment;
   transmitting an identification verification request to a delivery gateway, the delivery gateway monitoring data exiting from the first data environment, the identification verification request confirming that:

the dataset came from the first data environment; and
the dataset is intended to be transmitted to the second data environment;
initiating a security level compatibility check comprising:
retrieving a first security level associated with the first data environment and a second security level associated with the second data environment, the first and second security level being included in a plurality of security levels stored in a network repository;
determining a first range of security levels compatible with the first data environment;
determining a second range of security levels compatible with the second data environment; and
determining whether the first range is compatible with the second range based on a threshold compatibility value;
in response to a determination that a determined security level compatibility value is above the threshold compatibility value, removing the dataset from the hold at the reception gateway;
transmitting the dataset through an auto-sanitization engine, the auto-sanitization engine at the second data environment, the auto-sanitization engine:
fragmenting the data included in the dataset into a plurality of data segments;
assigning to each data segment a security level included in the plurality of security levels;
masking data segments determined to have a security clearance level greater than the security level of the second data environment;
labeling remaining data segments as open data segments; and
building a second dataset with the open data segments; and
storing the second dataset at the second data environment.

11. The method of claim 10 wherein the threshold compatibility value is determined by a predetermined maximum difference between the first range of security levels and the second range of security levels.

12. The method of claim 10 further comprising, when creating the second dataset with the open data segments deleting the masked data segments.

13. The method of claim 10 wherein, when the first range of security levels is determined not to be compatible with the second range of security levels, preventing transmission of dataset to the second data environment.

14. The method of claim 10 wherein the auto-sanitization engine includes an artificial intelligence model.

15. The method of claim 10 wherein when the delivery gateway does not respond to the identification verification request, the reception gateway is configured to halt transmission of the dataset.

16. The method of claim 10 further comprising performing a data push to an application programming interface (API), the API configured to:
register that:
the dataset is coming from the first data environment; and
the dataset is being transmitted to the second data environment; and
authenticate that:
the first data environment is the environment where the dataset came from; and
the dataset is being sent to the second data environment.

17. An apparatus for controlled data transmission between leveled data environments, the apparatus comprising:
a network, the network comprising a first data environment and a second data environment;
a data driver, the data driver comprising software configured to transmit a dataset from the first data environment to the second data environment;
a delivery gateway, the delivery gateway comprising a processor and memory configured to monitor data exiting from the first data environment; and
a reception gateway, the reception gateway comprising a processor and memory configured to enable entry of data into the second data environment, the reception gateway configured to:
intercept the data driver and initiate a hold on the dataset;
transmit an identification request to the delivery gateway, the identification request configured to request:
a data environment from which the data originated; and
a data environment to which the data is being transmitted;
in response to receiving a reply to the identification request, the reply identifying the data environment from which the data originated and the data environment to which the data is being transmitted, initiate an identification authentication protocol configured to:
retrieve, from a metadata storage location associated with each data environment, an environment identifier, the first data environment having a first environment identifier and the second data environment having a second data identifier;
retrieve, from the reply to the identification request, the identified data environments from which the data originated and to which the data is being transmitted; and
compare the environment identifiers from the metadata storage location with the data environments identified from the reply to the identification request;
in response to determining that the data environment from which the data originated is the first data environment, and the data environment to which the data is being transmitted is the second data environment, initiate a security level compatibility check configured to:
retrieve a first security level associated with the first data environment and a second security level associated with the second data environment, the first and second security level being included in a plurality of security levels stored in a network repository;
determine a first range of security levels compatible with the first data environment;
determine a second range of security levels compatible with the second data environment; and
determine whether the first range is compatible with the second range based on a threshold compatibility value;
in response to a determination that a determined security level compatibility value is above the threshold compatibility value, remove the dataset from the hold at the reception gateway;
transmit the dataset through an auto-sanitization engine, the auto-sanitization engine configured to:
fragment the data included in the dataset into a plurality of data segments;

assign to each data segment a security level included in the plurality of security levels;

mask data segments determined to have a security clearance level greater than the security level of the second data environment;

label remaining data segments as open data segments; and build a second dataset with the open data segments; and store the second dataset at the second data environment.

18. The apparatus of claim 17 wherein the threshold compatibility value is determined by a predetermined maximum difference between the first range of security levels and the second range of security levels.

19. The apparatus of claim 17 wherein when the delivery gateway does not respond to the identification request, the reception gateway is configured to halt transmission of the dataset.

20. The apparatus of claim 17 wherein the auto-sanitization engine includes an artificial intelligence model.

* * * * *